US011012131B2

(12) United States Patent
Hao et al.

(10) Patent No.: US 11,012,131 B2
(45) Date of Patent: May 18, 2021

(54) METHOD FOR HYBRID PRECODING AND COMMUNICATION DEVICE

(71) Applicant: Alcatel Lucent, Nozay (FR)

(72) Inventors: Jinping Hao, Shanghai (CN); Dong Li, Shanghai (CN)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 16/348,945

(22) PCT Filed: Nov. 10, 2017

(86) PCT No.: PCT/IB2017/001761
§ 371 (c)(1),
(2) Date: May 10, 2019

(87) PCT Pub. No.: WO2018/087604
PCT Pub. Date: May 17, 2018

(65) Prior Publication Data
US 2020/0186216 A1 Jun. 11, 2020

(30) Foreign Application Priority Data
Nov. 11, 2016 (CN) .......................... 201610995331.2

(51) Int. Cl.
*H04B 7/02* (2018.01)
*H04B 7/06* (2006.01)
(Continued)

(52) U.S. Cl.
CPC ......... *H04B 7/0617* (2013.01); *H04B 1/7102* (2013.01); *H04B 1/712* (2013.01);
(Continued)

(58) Field of Classification Search
CPC .... H04B 7/0617; H04B 1/712; H04B 7/0695; H04B 1/7102; H04B 7/0456; H04L 5/001
(Continued)

(56) References Cited

U.S. PATENT DOCUMENTS

2009/0252251 A1* 10/2009 Tosato ................. H04B 7/0639
375/267
2010/0087151 A1* 4/2010 Auer ..................... H04L 5/0023
455/67.11

(Continued)

FOREIGN PATENT DOCUMENTS

CN 104506281 B 12/2017

OTHER PUBLICATIONS

Motorola, Low-Overhead Feedback of Spatial Covariance Matrix,: $3^{rd}$ Generation Partnership Project (3GPP), 3GPP TSG RAN1#59, R1-094844, pp. 1-7, XP050597845, Jeju, South Korea, Nov. 9-13, 2009.

(Continued)

*Primary Examiner* — Don N Vo
(74) *Attorney, Agent, or Firm* — Fay Sharpe LLP

(57) ABSTRACT

Embodiments of the present disclosure relate to a method for hybrid precoding and a communication device. For example, at a communication device in a wireless communication system, a plurality of signals associated with a pilot are received from a plurality of antennas of a further communication device over a wireless channel. Then, angle-domain characteristics of the wireless channel are determined based on the plurality of signals, and spatial correlation characteristics of the wireless channel is determined based on the determined angle-domain characteristics. Moreover, since complete channel state information is no longer needed in determining the spatial correlation characteristics of the wireless channel, the pilot-related signals shorten in the time are sent from the transmitter end to the receiver end. There is further disclosed a communication device capable of implementing the above method.

18 Claims, 7 Drawing Sheets

(51) Int. Cl.
  *H04B 1/71*    (2011.01)
  *H04B 1/712*   (2011.01)
  *H04B 7/0456*  (2017.01)
  *H04L 5/00*    (2006.01)

(52) U.S. Cl.
  CPC ......... *H04B 7/0456* (2013.01); *H04B 7/0695* (2013.01); *H04L 5/001* (2013.01)

(58) Field of Classification Search
  USPC ........................................ 375/260, 262, 267
  See application file for complete search history.

(56) References Cited

U.S. PATENT DOCUMENTS

| | | | |
|---|---|---|---|
| 2012/0300867 A1* | 11/2012 | Chen | H04B 7/0456 375/267 |
| 2013/0156120 A1 | 6/2013 | Josiam et al. | |
| 2014/0307816 A1* | 10/2014 | Alex | H04L 25/0204 375/267 |
| 2018/0337717 A1* | 11/2018 | Nasiri Khormuji | H04B 7/0421 |

OTHER PUBLICATIONS

Song Gi Hong et al., "Beamspace MIMO transceivers for low-complexity and near-optimal communication at mm-wave frequencies," 2013 IEEE International Conference on Acoustics, Speech and Signal Processing (ICASSP), Institute of Electrical and Electronics Engineers, pp. 4394-4398, XP032508842, 2013.

Xinyu Gao et al., :/energy-Efficient Hybrid Analog and Digital Precoding for MmWave MIMO Systems With Large Antenna Arrays, IEEE Journal on Selected Areas in Communications, vol. 34, No. 4, pp. 998-1009, Apr. 2016.

Adrian Garcis-Rodriguez et al., Hybrid Analog-Digital Precoding Revisited under Realistic RF Modeling, IEEE Wireless Communications Letters, vol. PP, No. 99, pp. 1-12, 2016.

International Search Report for PCT/IB2017/001761 dated Jul. 16, 2018.

English Bibliography for Chinese Patent Application No. CN104506281B, Published Dec. 15, 2017, Printed from Derwent Innovation on Mar. 2, 2020, 6 pages.

PCT Patent Application No. PCT/IB2017/001761, Written Opinion of the International Searching Authority, dated Jul. 16, 2018, 10 pages.

Written Opinion of the International Searching Authority for PCT Application No. PCT/IB2017/001761, dated Jul. 16, 2018, 10 pages.

* cited by examiner

METHOD FOR HYBRID PRECODING AND COMMUNICATION DEVICE

FIELD

Embodiments of the present disclosure generally relate to communication technologies, and more particularly, to a method for hybrid precoding and a corresponding communication device.

BACKGROUND

The hybrid precoding technology has been proposed to remove an issue that precoding processing of a baseband signal is limited by hardware in a fifth-generation (5G) wireless communication system which enables massive Multiple-Input Multiple-Output (MIMO). Conventionally, the precoding is implemented in a digital domain at the baseband, where a dedicated radio frequency (RF) chain is typically arranged for each antenna. However, due to the high cost of RF chains and relevant devices such as analog-to-digital converters (ADC) as well as the high power consumption of these electronic devices at the mmWave frequency band in the 5G system, the full digital precoding is no longer suitable for the 5G system. The hybrid precoding as proposed is two-stage precoding including digital precoding and analogue precoding. In addition to performing the digital precoding at the baseband to enable the division of the RF chains, the analogue precoding is further performed to adjust phase shifts at the respective antennas to create a highly directive antenna pattern. This technology enables each of the RF chains to link with a plurality of antennas, thereby largely reducing the numbers of RF chains and antenna elements and further overcoming the hardware limitation.

However, it is a big challenge to design precoding parameters for this two-stage precoding processing. Ideally, the hybrid precoding parameters may be designed based on characteristics of wireless channels. For example, the spatial correlation matrix may be determined on the basis of the knowledge of complete channel state information (CSI). Nevertheless, it is hard to obtain accurate CSI in the massive MIMO system with a large number of antenna elements.

SUMMARY

In general, embodiments of the present disclosure present a method for hybrid precoding and a corresponding communication device.

In a first aspect, embodiments of the present disclosure provide a method implemented at a communication device in a wireless communication system, and the method comprise: receiving a plurality of signals associated with a pilot from a plurality of antennas of a further communication device in the wireless communication system over a wireless channel; determining angle-domain characteristics of the wireless channel based on the plurality of signals; and determining spatial correlation characteristics of the wireless channel based on the determined angle-domain characteristics.

In a second aspect, embodiments of the present disclosure provide a method implemented at a communication device in a wireless communication system, a bandwidth of the wireless communication system includes a first set of sub-carriers, and the communication device includes a plurality of antennas. The method comprises: generating, using digital precoding processing, a plurality of frequency-domain signals associated with a pilot and corresponding to a plurality of radio frequency chains, the plurality of frequency-domain signals being mapped to a second set of sub-carriers, the first number of the first set of sub-carriers exceeding the third number of the second set of sub-carriers; generating a plurality of time-domain signals based on the plurality of frequency-domain signals by using frequency-time domain transformation, the second number of time-domain samples included in each of the time-domain signals being less than the first number of the first set of sub-carriers; mapping, using analogue precoding processing, the plurality of time-domain signals to a plurality of antennas; and sending the plurality of time-domain signals to a further communication device in the wireless communication system via the plurality of antennas over a wireless channel.

In a third aspect, embodiments of the present disclosure provide a communication device operable in a wireless communication system. The communication device comprises: a receiver configured to receive a plurality of signals associated with a pilot from a plurality of antennas of a further communication device in the wireless communication system over a wireless channel; and a controller configured to: determine angle-domain characteristics of the wireless channel based on the plurality of signals; and determine spatial correlation characteristics of the wireless channel based on the determined angle-domain characteristics.

In a fourth aspect, embodiments of the present disclosure provide a communication device operable in a wireless communication system, and a bandwidth of the wireless communication system includes a first set of sub-carriers. The communication device comprises: a plurality of antennas; and a transmitter including: a digital precoder configured to generate, using digital precoding processing, a plurality of frequency-domain signals associated with a pilot and corresponding to a plurality of radio frequency chains, the plurality of frequency-domain signals being mapped to a second set of sub-carriers, the first number of the first set of sub-carriers exceeding the third number of the second set of sub-carriers; a frequency-time domain transformer configured to generate a plurality of time-domain signals based on the plurality of frequency-domain signals by using frequency-time domain transformation, a second number of time-domain samples included in each of the time-domain signals being less than the first number of the first set of sub-carriers; and an analogue precoder configured to map, using analogue precoding processing, the plurality of time-domain signals to a plurality of antennas, wherein the plurality of antennas are configured to send the plurality of time-domain signals to a further communication device in the wireless communication system over a wireless channel.

It is to be understood from the following description that according to embodiments of the present disclosure, the spatial correlation characteristics of the wireless channel are determined based on the angle-domain characteristics of the wireless channel instead of the channel state information. Since complete channel state information is no longer needed, the pilot-related signals shorten in the time are sent from the transmitter end to the receiver end. In this way, not only the computational complexity is reduced and efficiency is improved, but also time resources for transmitting pilot information are saved and the system overhead is reduced.

It is to be appreciated that contents as described in the SUMMARY portion are not intended to identify key or important features of embodiments of the present disclosure or used to limit the scope of the present disclosure. Other features of the present disclosure will become easily comprehensible through the following description.

BRIEF DESCRIPTION OF THE DRAWINGS

Through the following detailed description and with reference to the accompanying drawings, the above and other features, advantages and aspects of various embodiments of the present disclosure will become more apparent. In the drawings, same or similar reference signs represent the same or similar elements, where.

DETAILED DESCRIPTION OF EMBODIMENTS

Figure 1:
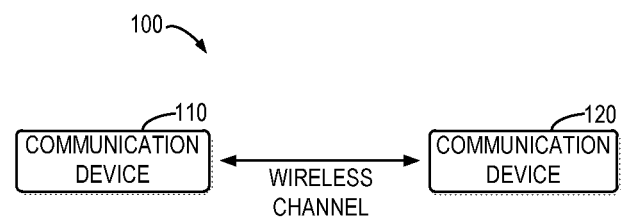
FIG. 1 shows an example wireless communication network in which embodiments of the present disclosure can be implemented.

Embodiments of the present disclosure will be described in more details with reference to the drawings. Although the drawings show some embodiments of the present disclosure, it is to be understood that the present disclosure may be implemented in various manners and should not be construed as being limited to the embodiments explained herein. On the contrary, the embodiments are provided for a more thorough and complete understanding of the present disclosure. It is to be understood that the drawings and embodiments of the present disclosure are only for the purpose of illustration, without suggesting any limitations on the protection scope of the present disclosure.

As used herein, the term "communication device" refers to a device capable of transmitting and receiving radio signals in a wireless communication device. Examples of the communication device include a network device and a terminal device.

As used herein, the term "network device" refers to a base station or other entities or nodes with specific functionality in a communication network. The "base station" (BS) may represent a node B (NodeB or NB), an Evolved Node B (eNodeB or eNB), a remote radio unit (RRU), a radio-frequency head (RH), a remote radio head (RRH), a repeater, or a low power node such as a Picocell, a Femto cell and the like.

As used herein, the term "terminal device" or "user equipment" (UE) refers to any end devices capable of performing wireless communication with the network device or with one another. As an example, the terminal device may include a mobile terminal (MT), a subscriber station (SS), a portable subscriber station (PSS), a mobile station (MS) or an access terminal (AT), and the above devices mounted on a vehicle.

As used herein, the term "angle-domain characteristics of a wireless channel" refers to characteristics, such as gain, fading, delay, and the like, of the wireless channel in different signal propagation angles. As used herein, the term "spatial correlation of a wireless channel" refers to autocorrelation of the wireless channel of an antenna array. As an example, the spatial correlation characteristics may be represented by a spatial correlation matrix.

As used herein, the terms "comprise", "include" and their variants are to be read as open terms that mean "include, but is not limited to". The term "based on" is to be read as "based at least in part on". The term "one embodiment" is to be read as "at least one embodiment"; the term "another embodiment" is to be read as "at least one other embodiment". Definitions of other terms will be presented in the following description.

As described above, conventional hybrid precoding algorithms need the knowledge of the complete instantaneous CSI. For example, when performing the hybrid precoding at the base station, the relevant parameters for hybrid precoding may be determined based on the spatial correlation matrix of the wireless channel. The spatial correlation matrix is typically computed based on instantaneous channel vectors associated with all antennas for transmitting signals at the base station. Conventionally, the spatial correlation matrix is first computed for each subcarrier with the CSI and then averaged over all subcarriers.

However, since a large number of antennas are used at the base station in the 5G system, it is difficult to obtain the complete channel information at the terminal side. In particular at mmWave band, due to the low received signal-to-noise ratio (SNR) at the terminal device, it is more difficult to estimate the CSI. In the conventional channel estimation algorithms such as minimum mean square error (MMSE), the computation complexity will increase significantly if the accuracy of estimating the CSI is to be improved. In addition, a large amount of pilot information, such as reference signals (RSs), needs to be transmitted to estimate the instantaneous CSI, resulting in large system overhead. Inventors have noticed that there is not yet an approach for estimating a spatial correlation matrix independently of CSI.

In order to at least partially solve these and other potential problems, embodiments of the present disclosure present an approach to fast estimate the spatial correlation matrix of the wireless channel without using the complete instantaneous CSI and design an efficient method for signal transmission.

In general, according to embodiments of the present disclosure, after a communication device in a wireless communication system receives a plurality of signals associated with a pilot from a plurality of antennas of a further communication over a wireless channel, angle-domain characteristics of the wireless channel are determined based on the received signals, and spatial correlation characteristics of the wireless channel are determined based on the determined angle-domain characteristics. Since the spatial correlation characteristics of the wireless channel are determined based on the angle-domain characteristics of the wireless channel rather than the complete CSI, the communication device can bypass the complex computations related to channel estimation. As compared with the conventional approach to determine the spatial correlation matrix based on the complete CSI, the computation complexity is greatly reduced, and hence this approach is more efficient.

Since the method for determining the spatial correlation characteristics based on the angle-domain characteristics of the wireless channel no longer requires the channel information on all carriers, the embodiments of the present disclosure further design a time-domain signal associated with a pilot. According to embodiments of the present disclosure, when a communication device sends pilot-related information to a further communication device in the wireless communication system, a plurality of frequency-domain signals associated with a pilot and corresponding to a plurality of RF chains are first generated using digital precoding processing, and these frequency-domain signals are mapped to a plurality of sub-carriers. The number of mapped sub-carriers is less than the number of sub-carriers included in the wireless communication system. Then, the communication device generates a plurality of corresponding time-domain signals based on the plurality of frequency-domain signals by using frequency-time domain transformation, and the number of time-domain samples in each of the time-domain signals is also less than the number of sub-carriers included in the bandwidth of the system. Next, the communication device maps the plurality of time-domain signals to a plurality of antennas using the analogue precoding processing and sends these time-domain signals to the further communication device over the wireless channel via a plurality of transmit antennas.

With the pilot-related signal shortened in the time-domain according to embodiments of the present disclosure, time resources for transmitting pilot information can be saved, and system overhead can be reduced. Although the pilot-related signal transmitted from the transmitter side to the receiver side is shortened in the time-domain, when the communication device at the receiver side determines the angle-domain characteristics and spatial correlation characteristics of the wireless channel according to embodiments of the present disclosure, the performance is not degraded at all, which will be described in detail with reference to simulation results.

Principles and specific embodiments of the present disclosure will be described in details with reference to FIGS. 1 to 8. Reference is first made to FIG. 1 which shows an example wireless communication system 100 in which embodiments of the present disclosure may be implemented. As shown, the wireless communication system 100 includes communication devices 110 and 120. The communication devices 110 and 120 may communicate with each other over a wireless channel. It should be understood the number of communication devices as shown in FIG. 1 is merely for the purpose of illustration, without suggesting any limitation. The wireless communication network 100 may include any suitable number of communication devices.

Communication in the wireless communication network 100 may be implemented according to any suitable communication protocol, including, but not limited to, the first generation (1G), the second generation (2G), the third generation (3G), the fourth generation (4G), the fifth generation (5G) and other cellular communication protocols, wireless local area network communication protocols such as Institute of Electrical and Electronics Engineers (IEEE) 802.11, and/or any other protocols that are currently known or to be developed in the future. Furthermore, the communication utilizes any suitable wireless communication technology, including, but not limited to, code division multiple access (CDMA), frequency division multiple access (FDMA), time division multiple access (TDMA), frequency division duplexing (FDD), time division duplexing (TDD), Multiple-Input Multiple-Output (MIMO), orthogonal frequency division multiplexing (OFDM), and/or any other technologies that are currently known or to be developed in the future.

Accordingly, the wireless communication system 100 may be implemented as any suitable system that can support the above respective communication protocols. As an example, the wireless communication system 100 may be implemented as an OFDM system. Then, the communication devices 110 and 120 may communicate using orthogonal sub-carriers in frequencies.

Figure 2:
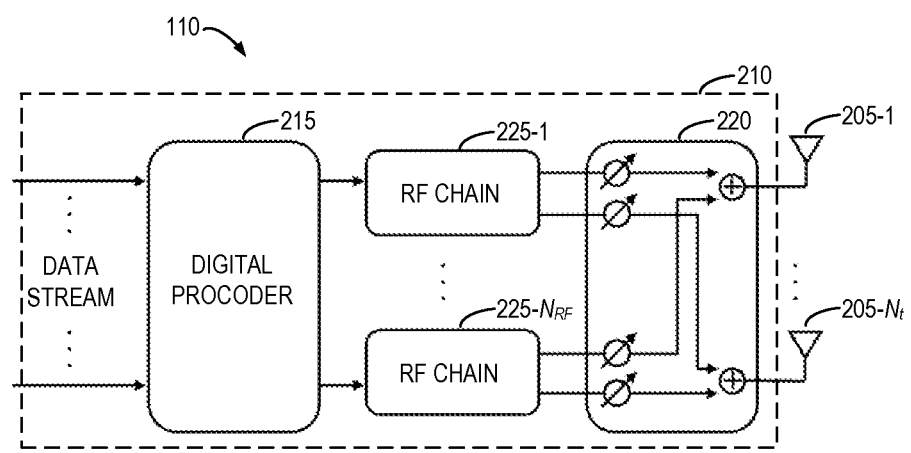
FIG. 2 shows an example structure of a communication device according to some embodiments of the present disclosure.

According to embodiments of the present disclosure, the communication device 110 sends a pilot-related signal to the communication device 120 via a plurality of antennas. FIG. 2 shows an example structure of the communication device 110 according to some embodiments of the present disclosure. As shown, the communication device 110 includes a plurality of antennas 205-1 to 205-$N_t$ (collectively referred to as "antennas" 205), and sends the pilot-related signal to the communication device 120 via these antennas 205.

The communication device 110 further includes a transmitter 210 cooperating with the antennas 205. As shown, the transmitter 210 includes a two-stage precoder, namely a digital precoder 215 and an analogue precoder 220, as well as a plurality of RF chains 225-1 to 225-$N_{RF}$ (collectively referred to as "RF chains" 225). The digital precoder 215 is used to perform the digital-domain precoding processing to generate a plurality of frequency-domain signals associated with the pilot. These frequency-domain signals are mapped to a plurality of sub-carriers, and each of the frequency-domain signals corresponds to one of the RF chains 225. In this example, the digital precoder 215 may receive a data stream associated with the pilot and output the corresponding $N_{RF}$ frequency-domain signals.

The frequency-domain signals outputted by the digital precoder 215 are transmitted to the analogue precoder 220 over the plurality of RF chains 225. The RF chains 225 include frequency-time domain transformers (not shown) for performing frequency-time domain transformation processing, such as fast Fourier transform (IFFT), so as to transform the frequency-domain signals to time-domain signals. Each of the RF chains 225 may further include any other suitable devices. As an example, the RF chain 225 may include a cyclic prefix (CP) inserter for performing CP insertion. Embodiments in this regard will be illustrated in detail with reference to FIGS. 5(a), 5(b), 6(a) and 6(b).

The analogue precoder 210 is used to perform the precoding processing in the analogue domain so as to map the time-domain signals generated over the RF chain 225 to the plurality of antennas 205. For example, the analogue precoder 210 may perform, for the respective antennas 205, processing such as up/down conversion, phase shifting, power amplification and so on, to form beams pointing to a plurality of directions. The antennas 205 may send out the pilot-related time-frequency signals using these beams.

It is to be understood the components included in the communication device 110 as shown in FIG. 2 are merely illustrative but not limited. The communication device 110 may further include any other components related to communications. For example, the communication device 110 may include a controller for controlling operations of the antennas 205 and the transmitter 210. Embodiment in this regard will be illustrated in detail with reference to FIG. 11.

As described above, relevant parameters for hybrid precoding may be determined based on the spatial correlation characteristics of the wireless channel. For example, during the analogue precoding processing, coefficients associated with beamforming vectors may be determined based on the spatial correlation matrix of the wireless channel while performing beamforming. Conventionally, knowledge of the complete CSI is typically required in order to obtain an accurate spatial correlation matrix at the receiver end. That is, the communication device 110 needs to send a large amount of pilot information to the communication device 120, which will cause the large system overhead. In addition, when the communication device 120 computes the spatial correlation matrix based on the large amount of pilot information, huge computations will be involved, which leads to low efficiency.

According to embodiments of the present disclosure, the communication device 120 determines the spatial correlation characteristics of the wireless channel based on the angle-domain characteristics of the wireless channel rather than the CSI, thereby greatly reducing the computational load and improving the efficiency. Detailed operations of the communication device 120 will be described below with reference to FIG. 3.

Figure 3:
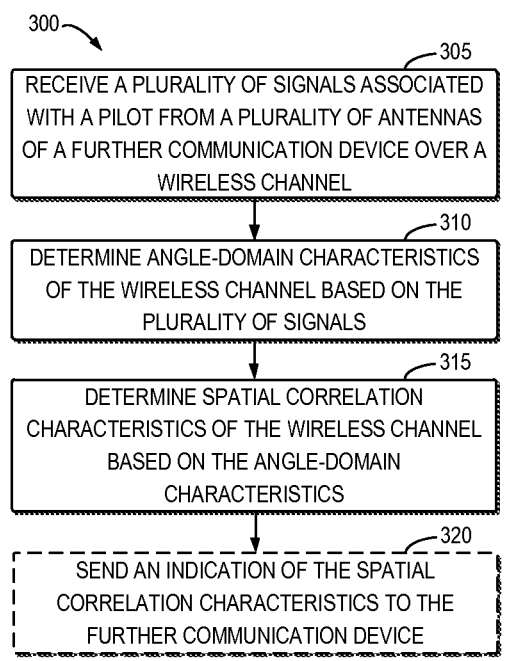
FIG. 3 shows a flowchart of a method implemented at a communication device according to some embodiments of the present disclosure.

FIG. 3 shows a flowchart of a method 300 implemented at a communication device according to some embodiments of the present disclosure. The method 300 may be implemented at the communication device 120. For the purpose of discussion, the method 300 will be described with reference to FIGS. 1 and 2.

As shown, at 305, the communication device 120 receives a plurality of signals associated with a pilot from the plurality of antennas 205 of the communication device 110 over the wireless channel. At 310, the communication device 120 determines the angle-domain characteristics of the wireless channel based on a plurality of received signals.

According to embodiments of the present disclosure, wireless channel characteristics at any suitable signal propagation angle, such as gain, fading, delay, and the like, may be determined as the angle-domain characteristics of the wireless channel. As an example, at least one direction of departure (DoD) of the received signals from the communication device 110 may be used as a signal propagation angle, and a gain of the wireless channel at this angle may be determined accordingly.

The DoD of the signals may be determined in any suitable approach. In some embodiments, the communication devices 110 and 120 may predefine a plurality of orthogonal beamforming vectors for beamforming a signal to be sent at the communication device 110. Any suitable orthogonal vector may be used as the beamforming vector. As an example, orthogonal column vectors of a discrete Fourier transform (DFT) matrix may be chosen as the orthogonal beamforming vectors. Alternatively, a codebook with orthogonality may be used as the beamforming vectors. In the case that a plurality of orthogonal beamforming vectors have been predefined, the communication device 120 may determine directions indicated by the beamforming vectors as the DoDs of the received signals and further determine gains of the wireless channel in these directions.

After determining the angle-domain characteristics of the wireless channel, at 315, the communication device 120 determines the spatial correlation characteristics of the wireless channel based on the determined angle-domain characteristics. The spatial correlation characteristics may be represented in any suitable form. For example, the spatial correlation characteristics may be represented by a spatial correlation matrix of the wireless channel. According to embodiments of the present disclosure, the spatial correlation characteristics may be determined using any suitable algorithm based on the angle-domain characteristics. A detailed example will be described below.

As shown in FIG. 2, the communication device 110 may include the $N_{RF}$ RF chains 225, which are connect to the $N_t$ antennas 205. In this example, the $N_t$ antennas form a uniform linear array (ULA), and the antenna elements are spaced with half a wavelength. In addition, column vectors of the DFT matrix W are used as the beamforming vectors to represent different DoDs. That is, the signals transmitted over different RF chains 225 at the same time are beamformed using different column vectors of the DFT matrix. The number of column vectors of the DFT matrix is equal to the number $N_t$ of the antennas 205, the number of row vectors is equal to the number $N_{RF}$ of the RF chains 225.

In this example, the wireless channel is represented using a geometric channel model. In the geometric channel model, the channel gain is represented as the summation of gains on different main propagation paths. Accordingly, the wireless channel may be modeled as an equation below:

$$h = \sqrt{\frac{N_t}{L}} \sum_{l=1}^{L} \alpha_l a(\varphi_l) \tag{1}$$

where $\varphi_l$ represents the DoD of the l-th signal propagation path in the angle domain, $a(\varphi_l)$ represents the array response vector for the l-th path, $\alpha_l$ denotes the complex array gain, and L is the total number of propagation paths.

For a ULA with the $N_t$ antenna elements, the array response $a(\varphi_l)$ may be represented as below:

$$a(\varphi) = \frac{1}{\sqrt{N}}[1, e^{jkd\,sin(\varphi)}, \ldots, e^{j(N-1)kd\,sin(\varphi)}]^T \tag{2}$$

where $m=2\pi/\lambda$ ($\lambda$ is the wavelength), and d is the distance between the antenna elements (d=0.52$\lambda$).

In this example, since the column vectors of the DFT matrix W are used as the beamforming vectors, directions indicated by the column vectors of the matrix W are determined as the DoDs corresponding to signal propagation paths. If $w_l$ denotes the l-th column vector of the matrix W, then $a(\varphi_l)=w_l$. As described above, the number of column vectors $w_l$ of the matrix W is equal to the number $N_t$ of the antennas 205, so $L=N_t$.

If $[\beta_1, \beta_2, \ldots, \beta_N]^T = \sqrt{N_t/L}[\alpha_1, \alpha_2, \ldots, \alpha_N]^T$, where $N=N_t$, then Equation (1) may be written as:

$$h = W[\beta_1, \beta_2, \ldots, \beta_N]^T \tag{3}$$

Accordingly, the signal received by the communication device 120 at the k-th carrier on the l-th path may be represented as:

$$y_k = h_k^H w_l s + e \tag{4}$$

where e represents the additive white Gaussian noise, and s represents the signal. Then, the effective complex channel gain on the l-th path is calculated below:

$$\tilde{\beta} = \frac{y}{s} = (W[\beta_1, \beta_2, \ldots, \beta_N]^T)^H w_l + \frac{e}{s} \tag{5}$$

$$= \beta_l + \frac{e}{s}$$

It can be seen that in the case where the transmitter end beamforms a signal using a beamforming vector corresponding to a certain direction, the receiver end can easily obtain the complex channel gain in this direction based on the beamforming vector. After the communication device 120 receives all the signals from the plurality of antennas 205 of the communication device 110, complex channel gains on all the DoDs may be estimated. Then, the spatial correlation characteristics of the wireless channel may be calculated with the complex channel gains on all the DoDs.

In this example, the spatial correlation characteristics of the wireless channel are represented using a spatial correlation matrix R, and then the spatial correlation matrix R is calculated as below:

$$R = \sum_\Omega \frac{(W[\tilde{\beta}_1, \tilde{\beta}_2, \ldots, \tilde{\beta}_N]^T [\tilde{\beta}_1, \tilde{\beta}_2, \ldots, \tilde{\beta}_N]^* W^H)}{|\Omega|} \quad (6)$$

where $\Omega$ represents the set of subcarriers in which the same beamforming vectors are applied, and $|\Omega|$ denotes the number of subcarriers in the set.

This approach requires no longer the complete CSI knowledge, so that a complex channel estimation procedure may be avoided and the more accurate spatial correlation characteristics of the wireless channel may be obtained with less amount of computation. The method according to embodiments is more efficient and simpler than the conventional approach of estimating CSI using the MMSE algorithm and further determining the spatial correlation matrix.

Still with reference to FIG. 3, after determining the spatial correlation characteristics of the wireless channel, the communication device 120 may send an indication of the spatial correlation characteristics to the communication device 110 at 320, so that the communication device 110 may adjust the analogue precoding processing according to the spatial correlation characteristics, for example, adjusting the weights of the beamforming vectors, to form a highly directive antenna pattern. Detailed operations of the communication device 110 will be illustrated in detail with reference to FIGS. 4, 5(a), 5(b), 6(a) and 6(b).

Since the spatial correlation characteristics are determined based on the angle-domain characteristics of the wireless channel, channel information on all the carriers is no longer needed. Accordingly, in some embodiments, the number of time-domain samples included in the signals received by the communication device 120 from the communication device 110 may be less than the number of sub-carriers included in the bandwidth of the wireless communication system 100. For the purpose of discussion, the sub-carriers included in the bandwidth of the system are referred to as "a first set of sub-carriers", having a number called "the first number", and the number of time-domain samples included in the signals received by the communication device 120 from the communication device 110 is called "the second number". Detailed implementations in this regard will be described below with reference to FIGS. 4, 5(a), 5(b), 6(a) and 6(b).

Figure 4:
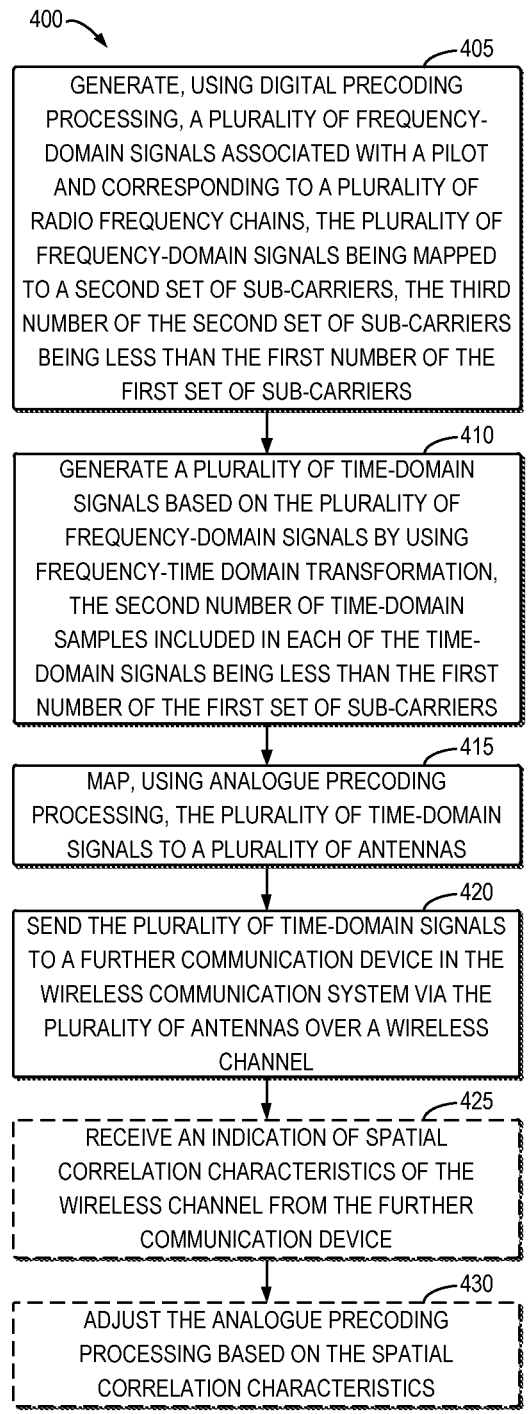
FIG. 4 shows a flowchart of a method implemented at a communication device according to some other embodiments of the present disclosure.

FIG. 4 shows a flowchart of a method 400 implemented at a communication device according to some embodiments of the present disclosure. The method 400 may be implemented at the communication device 110. For the purpose of discussion, the method 400 will be described below with reference to FIGS. 1 and 2.

As shown, at 405, the communication device 110 generates a plurality of frequency-domain signals associated with a pilot and corresponding to the plurality of RF chains 225 using the digital precoding process (for example, by the digital precoder 215), and these frequency-domain signals are mapped to a plurality of sub-carriers (referred to as "a second set of sub-carriers"). The number of the second set of sub-carriers (referred to as "the third number") is less than the first number of the first set of sub-carriers included in the bandwidth of the system. According to embodiments of the present disclosure, the third number may be any suitable number less than the first number.

Any suitable approach may be used to shorten the bandwidth in the digital precoding processing. As an example, the pilot-related frequency-domain signals may be mapped to the sub-carriers according to a predefined sub-carrier spacing. Alternatively, the frequency-domain signals may be further mapped to a portion of successive sub-carriers in the first set of sub-carriers. A specific example in this regard will be illustrated in detail with reference to FIGS. 5(a), 5(b), 6(a) and 6(b).

After generating the plurality of frequency-domain signals associated with the pilot, at 410, the communication device 110 generates a plurality of corresponding time-domain signals based on the plurality of frequency-domain signals using the frequency-time domain transformation. As described above, the second number of time-domain samples in each of the time-domain signals is also less than the first number of the first set of sub-carriers. Likewise, the second number may also be any suitable number less than the first number.

In an embodiment that the wireless communication system 100 is implemented as an OFDM system and the system bandwidth is divided into 2048 sub-carriers, the frequency-domain signals having less than 2048 sub-carriers and the OFDM symbols including less than 2048 samples may be generated. As an example, each of the generated OFDM symbols may include $2048/\delta$ samples, where $\delta=2^n$, and n is a natural number. It is to be understood that this is merely illustrative but not limited. Other numbers of sub-carriers and samples may also be possible.

Conventionally, as described above, in order to obtain the complete CSI, pilots typically need to be sent using all sub-carriers included in the system bandwidth, and then signals including the number samples equal to the number of sub-carriers need to be sent. Therefore, with the approach described above, the system overhead may be reduced to be $1/\delta$ of that of the conventional approach.

Figure 5A:
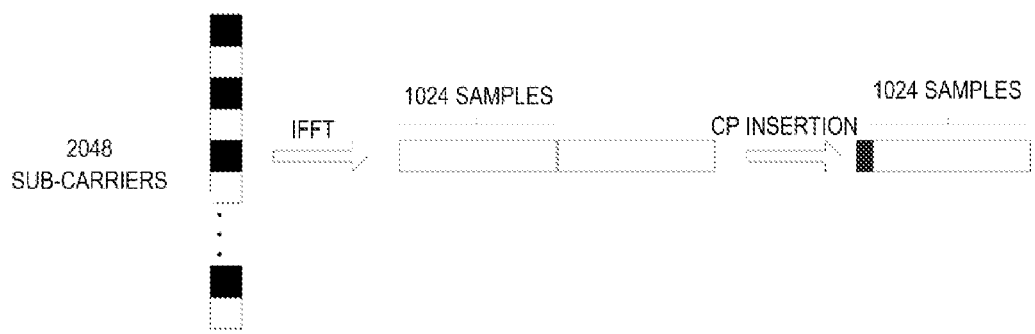
FIGS. 5(a) and 5(b) show example methods for generating shortened orthogonal frequency division Multiplexing (OFDM) signals according to some embodiments of the present disclosure.
Figure 5B:
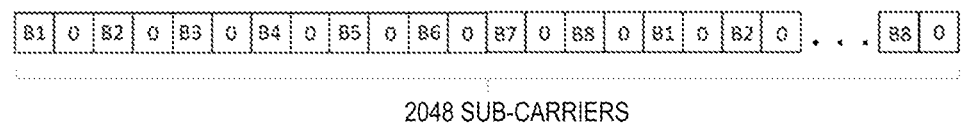
Figure 6A:
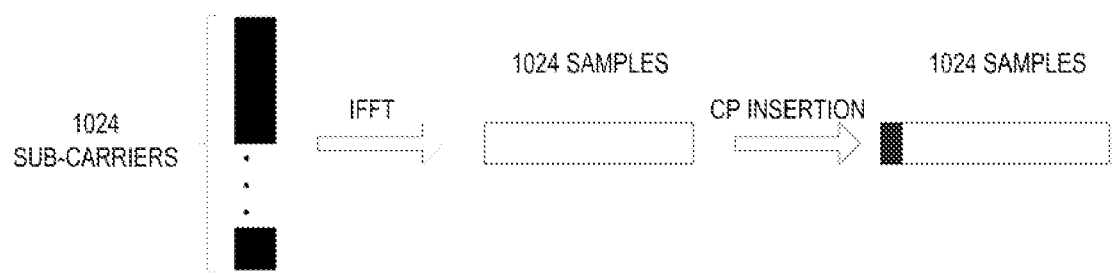
FIGS. 6(a) and 6(b) show example methods for generating shortened OFDM signals according to some other embodiments of the present disclosure.
Figure 6B:
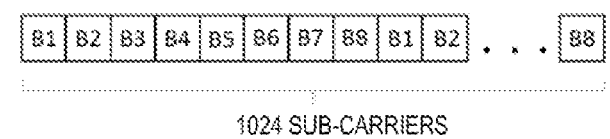

FIGS. 5(a), 5(b), 6(a) and 6(b) show example procedures of generating frequency-domain signals with shortened bandwidth and time-domain signals with a reduced number of samples according to some embodiments of the present disclosure, where FIGS. 5(a) and 5(b) show shortening of the bandwidth implemented by mapping to the sub-carriers separated from each other and FIGS. 6(b) and 6(b) show shortening of the transmission bandwidth implemented by mapping to a portion of the successive sub-carriers. In this example, the wireless communication system 100 is implemented as an OFDM system, the system bandwidth includes 2048 sub-carriers, and the occupied transmission bandwidth is shortened to half of the system bandwidth. Moreover, the number $N_{RF}$ of RF chains 225 included in the communication device 110 is 8, and the number $N_t$ of the antennas 205 is 128. Accordingly, the number of beamforming vectors is also 128.

As shown in FIG. 5(a), the frequency-domain signals are mapped, for example, by the digital precoder 215 onto the 1st, 3rd, . . . , 2047th sub-carriers among the 2048 sub-carriers, and zeroes are inserted onto the remaining sub-carriers. Next, the 2048-point IFFT processing is performed on the RF chain 225, and the resulting equivalent time-domain waveform includes 2 repeated sequences as shown, each including 1024 samples. In this example, the last 1024 samples are discarded. Then, a shortened cyclic prefix (CP) sequence (for example, having one half of the length of a CP sequence inserted in the conventional approach) is inserted, for example, by a CP inserter on the RF chain 225, and thereby the shortened OFDM symbol is obtained. The signals from the 8 RF chains 225 occupy the 8 orthogonal sub-carriers B1, B2, ..., B8 as shown in FIG. 5(b).

In the example as shown in FIGS. 6(a) and 6(b), frequency-domain signals are mapped to the first 1024 sub-carriers, and then the time-domain signals including 1024 samples are generated after the 1024-point IFFT processing. Next, the shortened CP sequence (for example, having one half of the length of the conventional CP sequence) is likewise inserted, and thereby the shortened OFDM symbol is obtained. The signals from the 8 RF chains 225 occupy the 8 orthogonal sub-carriers B1, B2, ..., B8 as shown in FIG. 6(b).

In this example, the number of the RF chains 225 included in the communication device 110 is 8, and the number of beamforming vectors is 128. In order to exhaust all the 128 beamforming vectors, only 16 shortened OFDM symbols are required, which are equivalent to only 8 conventional OFDM symbols. Thus, the system overhead for pilot transmission is greatly reduced.

An example where the transmission bandwidth is shortened to one fourth of the system bandwidth will be discussed below. In this example, the wireless communication system 100 is also implemented as an OFDM system with the bandwidth including 2048 sub-carriers. Likewise, the transmission bandwidth may be shortened by mapping to the separated sub-carriers or mapping to a portion of the successive sub-carriers. In an embodiment of mapping to the sub-carriers separated from each other, the frequency-domain signals may be mapped onto the 1st, 5th, ..., 2045th sub-carriers among the 2048 sub-carriers, and zeroes are inserted onto the remaining sub-carriers. Next, after the 2048-point IFFT processing is performed, the equivalent time-domain waveform includes 4 repeated sequences, and each sequence includes 512 samples. Subsequently, the last 1536 samples are discarded, and the shortened OFDM symbol is obtained by inserting a shortened CP sequence that is one fourth of the length of a traditional CP sequence.

In an embodiment of mapping to a portion of continuous sub-carriers, frequency-domain signals may be mapped to the first 512 sub-carriers, and then time-domain signals consisting of 512 samples are generated through the 512-point IFFT process. After a shortened CP sequence is inserted, the shortened OFDM signal is obtained.

Still with reference to FIG. 4, after generating a plurality of signals shorten in the time domain, the communication device 110 maps the generated time-domain signals to the plurality of antennas 205 with the analogue precoding processing (for example, by the analogue precoder 220) at 415, and then at 420 sends the shortened time-domain signals associated with the pilot to the communication device 120 via the plurality of antennas 205 over the wireless channel. In this way, the system overhead for transmitting pilot information may be reduced significantly. As described above, the communication device 110 may perform the analogue precoding processing in any suitable approach. In some embodiments, these time-domain signals may be beamformed using a plurality of orthogonal beamforming vectors. The specific processing procedure has been described in detail and thus will not be repeated.

In addition, the communication device 110 may further receive an indication of the spatial correlation characteristics of the wireless channel from the communication device 120 at 425. Then, at 430 the communication device 110 may adjust the analogue precoding processing based on the spatial correlation characteristics, for example, adjusting the weights of the beamforming vectors. In an embodiment that the spatial correlation characteristics are represented using the spatial correlation matrix of the wireless channel, the communication device 110 may adjust the beamforming vectors based on the spatial correlation matrix received from the communication device 120. The procedure of adjusting the beamforming vectors based on the spatial correlation matrix is well known in the art, it is not discussed herein.

According to embodiments of the present disclosure, since the spatial correlation characteristics may be determined based on the angle-domain characteristics of the wireless channel and the conventional instantaneous CSI estimation is no longer needed, the pilot-related signals shorten in the time may be transmitted. The method as proposed not only greatly lowers the computation complexity but also significantly reduces the system overhead for pilot information transmission, without causing performance degradation.

Figure 7:
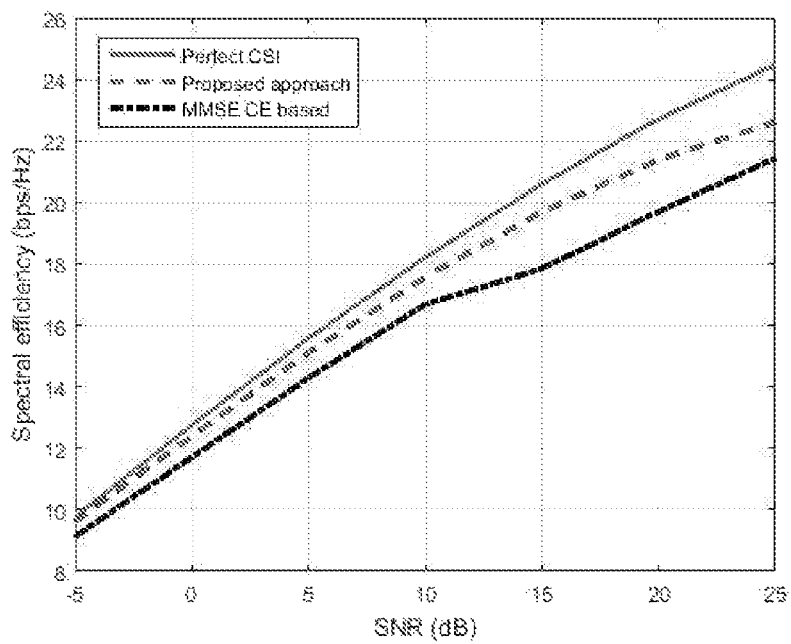
FIGS. 7 and 8 show a spectral efficiency comparison between a method according to embodiments of the present disclosure and the conventional method.
Figure 8:
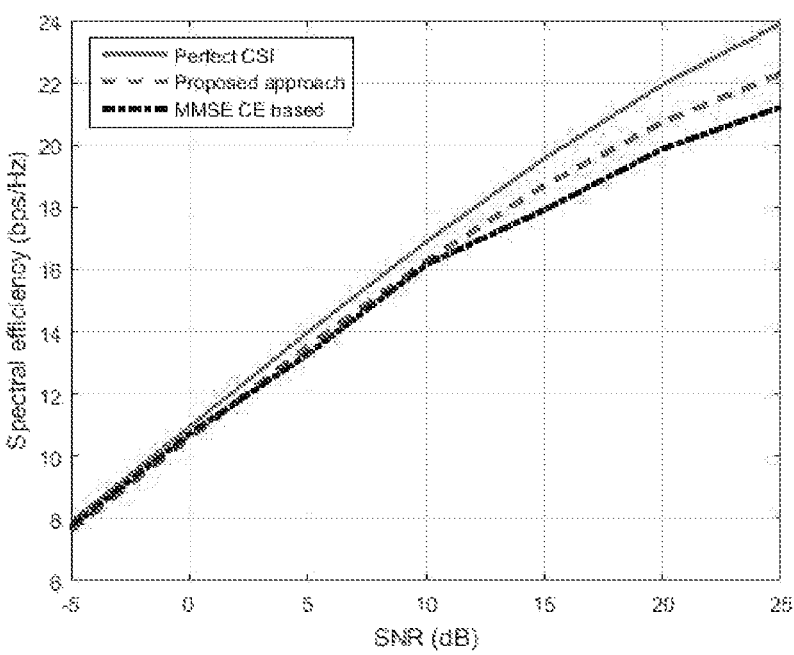

FIGS. 7 and 8 show spectral efficiency comparisons between an approach according to embodiments of the present disclosure and the conventional approach, where FIG. 7 shows a performance comparison when the transmission bandwidth is shorted to half of the system bandwidth as discussed with reference to FIGS. 5(a), 5(b), 6(a) and 6(b), and FIG. 8 shows a performance comparison when the transmission bandwidth is shortened to one fourth of the system bandwidth. As shown, the method according to embodiments of the present disclosure at least obtains similar performance to the conventional approach and even better performance in some cases.

Figure 9:
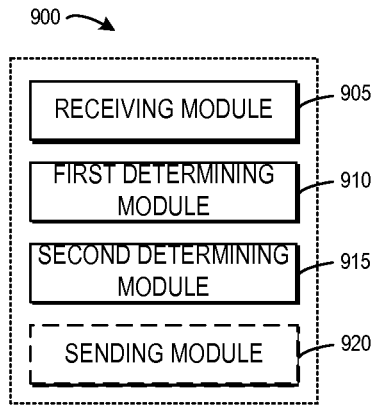
FIG. 9 shows a block diagram of an apparatus according to some embodiments of the present disclosure.

FIG. 9 shows a block diagram of an apparatus 900 according to some embodiments of the present disclosure. It is to be understood that the apparatus 900 may be implemented at the communication device 120 shown in FIGS. 1 and 2. As shown, the apparatus 900 (for example, the communication device 120) comprises: a receiving module 905 configured to receive a plurality of signals associated with a pilot from a plurality of antennas of a communication device (for example, the communication device 110) in a wireless communication system over a wireless channel; a first determining module 910 configured to determine angle-domain characteristics of the wireless channel based on the plurality of received signals; and a second determining module 915 configured to determine spatial correlation characteristics of the wireless channel based on the determined angle-domain characteristics.

In some embodiments, the first determining module 910 may include a third determining module configured to determine a gain of the wireless channel in at least one direction of departure of the plurality of signals. In some embodiments, the third determining module may include: a fourth determining module configured to determine directions indicated by a plurality of orthogonal beamforming vectors as the direction of departure, the plurality of orthogonal beamforming vectors being predefined by the apparatus 900 and a further communication device for beamforming of a signal to be sent at the further communication device; and a fifth determining module configured to determine the gain of the wireless channel in the direction indicated by the beamforming vectors. In some embodiments, the plurality of orthogonal beamforming vectors may include column vectors of a discrete Fourier transform matrix.

In some embodiments, a bandwidth of the wireless communication system may include a first set of sub-carriers, and the first number of the first set of sub-carriers exceeds the second number of time-domain samples included in each of the signals.

In some embodiments, the apparatus 900 may further comprise a sending module 920 configured to send an indication of the determined spatial correlation characteristics to the further communication device.

Figure 10:
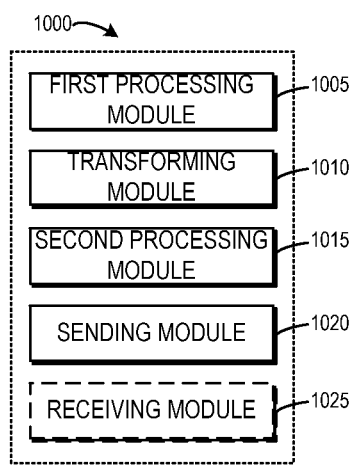
FIG. 10 shows a block diagram of an apparatus according to some other embodiments of the present disclosure.

FIG. 10 shows a block diagram of an apparatus 1000 according to some embodiments of the present disclosure. It is to be understood that the apparatus 1000 may be implemented at the communication device 110 shown in FIGS. 1 and 2. As shown, the apparatus 1000 (for example, the communication device 110) comprises: a first processing module 1005 configured to generate frequency-domain signals associated with a pilot by using digital precoding process, the frequency-domain signals being mapped to a second set of sub-carriers, the first number of a first set of sub-carriers included in a bandwidth of a wireless communication system exceeding the third number of a second set of sub-carriers; a transforming module 1010 configured to generate a plurality of time-domain signals based on the frequency-domain signals by using frequency-time domain transformation, the second number of time-domain samples included in each time-domain signal being less than the first number of the first set of sub-carriers; a second processing module 1015 configured to map the plurality of time-domain signals to a plurality of antennas by using analogue precoding processing; and a sending module 1020 configured to send the plurality of time-domain signals to a further communication device in the wireless communication system via the plurality of antennas over a wireless channel.

In some embodiments, the second processing module 1015 may include a third processing module configured to beamform the plurality of time-domain signals with a plurality of orthogonal beamforming vectors.

In some embodiments, the apparatus 1000 may further comprise a receiving module 1025 configured to receive an indication of spatial correlation characteristics of the wireless channel from the further communication device. In this example, the second processing module 1015 may further include a first adjusting module configured to adjust the analogue precoding processing based on the spatial correlation characteristics. In some embodiments, the first adjusting module may include a second adjusting module configured to adjust weights of the beamforming vectors based on the spatial correlation characteristics.

In some embodiments, the first number of the first set of sub-carriers may be above two times as large as the third number of the second set of sub-carriers.

It is to be understood each module of the apparatuses 900 and 1000 corresponds to each step of the methods 300 and 400 described with reference to FIGS. 1 to 8. Therefore, operations and features described above with reference to FIGS. 1 to 8 are also applicable to the apparatuses 900 and 1000 as well as modules included therein and meanwhile have the same effect, and details thereof will be not repeated here.

The modules included in the apparatuses 900 and 1000 may be implemented in various manners, including software, hardware, firmware, or any combination thereof. In one embodiment, one or more modules may be implemented using software and/or firmware, for example, machine-executable instructions stored on the storage medium. In addition to or instead of machine-executable instructions, parts or all of the modules in the apparatus 900 and 1000 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The modules shown in FIGS. 9 and 10 may be implemented, partially or entirely, as hardware modules, software modules, firmware modules or any combination thereof. In particular, in some embodiments, the flows, methods or processes described above may be implemented by hardware in a communication device. For example, the communication device may implement the methods 300 and 400 by means of its transmitter, receiver, transceiver and/or processor or controller.

Figure 11:
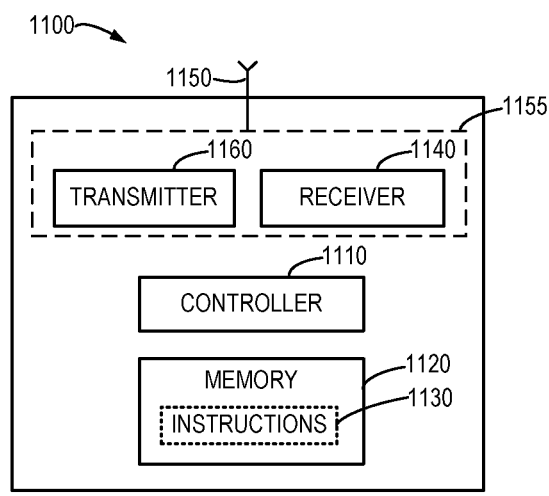
FIG. 11 shows a block diagram of a device suitable for implementing some embodiments of the present disclosure.

FIG. 11 shows a block diagram of a device 1100 suitable for implementing embodiments of the present disclosure. The device 1100 may be used to implement the communication device 110 or 120 shown in FIGS. 1 and 2.

As shown, the device 1100 includes a controller 1110. The controller 1110 controls operations and functions of the device 1100. For example, in some embodiments, the controller 1110 may execute various operations by means of instructions 1130 stored in a memory 1120 coupled to the controller 1110. The memory 1120 may be of any suitable type suitable for a local technical environment, and may be implemented using any suitable data storage technique, including without limitation to, a semiconductor based memory device, a magnetic memory device and system, an optical memory device and system. Although only one memory unit is shown in FIG. 11, there may be a plurality of physically different memory units in the device 1100.

The controller 1110 may be of any suitable type suitable for a local technical environment, and may include without limitation to, one or more of a general-purpose computer, a special purpose computer, a microcontroller, a digital signal processor (DSP), and a multi-core controller architecture based on controllers. The device 1100 may also include a plurality of controllers 1110. The controller 1110 is coupled to a communication module 1155. The communication module 1155 includes a receiver 1140 and a transmitter 1160 and may enable information receiving and transmitting by means of one or more antennas 1150 and/or other components.

When the device 1100 acts as the communication device 120, the controller 1110, the receiver 1140, the transmitter 1160 and the antenna 1150 may operate in cooperation to implement the method 300 described with reference to FIG. 3. When the device 1100 acts as the communication device 110, the transmitter 1160 may be implemented as the transmitter 205 shown in FIG. 2, and the antenna 1150 may be implemented as the plurality of antennas 205 shown in FIG. 2. Accordingly, a controller 1210, the transmitter 210, a receiver 1240 and the plurality of antennas 205 may operate in cooperation to implement the method 400 described with reference to FIG. 4. All features described with reference to FIGS. 1 to 8 are applicable to the device 1100 and will not be repeated here.

Generally, various example embodiments of the present disclosure may be implemented in hardware, special purpose circuits, software, logic or any combinations thereof. Some aspects may be implemented in hardware while other aspects may be implemented in firmware or software executed by controllers, microprocessors or other computing devices. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

As an example, embodiments of the present disclosure may be described in the context of machine-executable instructions, which is included in program modules executed in devices on a target physical or virtual processor, for example. In general, program modules comprise routines, programs, libraries, objects, classes, components, data structures, and the like, that perform particular tasks or implement particular abstract data structures. The functionality of the program modules may be combined or split between program modules as desired in various embodiments. Machine-executable instructions for program modules may be executed within a local or distributed device. In a distributed device, program modules may be located in both local and remote storage media.

Computer program codes for carrying out methods of the present disclosure may be written in any combination of one or more programming languages. The computer program codes may be provided to a processor of a general-purpose computer, a special purpose computer or other programmable data processing apparatuses, such that the program codes, when executed by the computer or other programmable data processing apparatuses, cause the functions/operations specified in the flowcharts and/or block diagrams to be implemented. The program codes may be executed entirely on a machine, partly on the machine, as a stand-alone software package, partly on the machine and partly on a remote machine or entirely on the remote machine or server.

In the context of the present disclosure, a machine-readable medium may be any tangible medium that contains or stores programs for or related to an instruction executing system, apparatus or device. The machine-readable medium may be a machine-readable signal medium or a machine-readable storage medium and may include but not limited to an electronic, magnetic, optical, electromagnetic, infrared, or semiconductor system, apparatus or device, or any suitable combination thereof. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof.

Furthermore, although operations are depicted in a particular order, it is to be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

We claim:

1. A method implemented at a communication device in a wireless communication system, the method comprising:
    receiving a plurality of signals associated with a pilot from a plurality of antennas of a further communication device in the wireless communication system over a wireless channel;
    determining angle-domain characteristics of the wireless channel based on the plurality of signals; and
    determining spatial correlation characteristics of the wireless channel based on the determined angle-domain characteristics;
    wherein a bandwidth of the wireless communication system includes a first set of sub-carriers;
    wherein a first number of the first set of sub-carriers exceeds a second number of time-domain samples included in each of the signals.

2. The method according to claim 1, wherein determining the angle-domain characteristics of the wireless channel comprises:
    determining a gain of the wireless channel in at least one direction of departure of the plurality of signals.

3. The method according to claim 2, wherein determining the gain of the wireless channel in the at least one direction of departure of the plurality of signals comprises:
    determining a direction indicated by a plurality of orthogonal beamforming vectors as the direction of departure, the plurality of orthogonal beamforming vectors being predefined by the communication device and the further communication device for beamforming of a signal to be sent at the further communication device; and
    determining the gain of the wireless channel in the direction indicated by the beamforming vectors.

4. The method according to claim 3, wherein the plurality of orthogonal beamforming vectors include common vectors of a discrete Fourier transform matrix.

5. The method according to claim 1, further comprising:
    sending an indication of the determined spatial correlation characteristics to the further communication device.

6. A method implemented at a communication device in a wireless communication system, a bandwidth of the wireless communication system including a first set of sub-carriers, the communication device including a plurality of antennas, the method comprising:
    generating, using digital precoding processing, a plurality of frequency-domain signals associated with a pilot and corresponding to a plurality of radio frequency chains, the plurality of frequency-domain signals being mapped to a second set of sub-carriers, a first number of the first set of sub-carriers exceeding a third number of the second set of sub-carriers;
    generating a plurality of time-domain signals based on the plurality of frequency-domain signals by using frequency-time domain transformation, a second number of time-domain samples included in each of the time-domain signals being less than the first number of the first set of sub-carriers;

mapping, using analogue precoding processing, the plurality of time-domain signals to a plurality of antennas; and sending the plurality of time-domain signals to a further communication device in the wireless communication system via the plurality of antennas over a wireless channel.

7. The method according to claim 6, wherein mapping the plurality of time-domain signals to the plurality of antennas comprises:

beamforming the plurality of time-domain signals with a plurality of orthogonal beamforming vectors.

8. The method according to claim 7, further comprising:

receiving an indication of spatial correlation characteristics of the wireless channel from the further communication device; and adjusting weights of the beamforming vectors based on the spatial correlation characteristics.

9. The method according to claim 6, wherein the first number of the first set of sub-carriers is above two times as large as the third number of the second set of sub-carriers.

10. A communication device operable in a wireless communication system, the communication device comprising:

a receiver configured to receive a plurality of signals associated with a pilot from a plurality of antennas of a further communication device in the wireless communication system over a wireless channel; and a controller configured to:

determine angle-domain characteristics of the wireless channel based on the plurality of signals; and determine spatial correlation characteristics of the wireless channel based on the determined angle-domain characteristics;

wherein a bandwidth of the wireless communication system includes a first set of sub-carriers;

wherein a first number of the first set of sub-carriers exceeds a second number of time-domain samples included in each of the signals.

11. The communication device according to claim 10, wherein the controller is configured to:

determine a direction indicated by a plurality of orthogonal beamforming vectors as a direction of departure of the plurality of signals, the plurality of orthogonal beamforming vectors being predefined by the communication device and the further communication device for beamforming of a signal to be sent at the further communication device; and determine the gain of the wireless channel in the direction indicated by the beamforming vectors.

12. The communication device according to claim 11, wherein the plurality of orthogonal beamforming vectors include common vectors of a discrete Fourier transform matrix.

13. The communication device according to claim 10, further comprising:

a transmitter configured to send an indication of the determined spatial correlation characteristics to the further communication device.

14. The communication device according to claim 10, wherein the controller is configured to determine a gain of the wireless channel in at least one direction of departure of the plurality of signals.

15. A communication device operable in a wireless communication system, a bandwidth of the wireless communication system including a first set of sub-carriers, the communication device comprising:

a plurality of antennas; and a transmitter including:

a digital precoder configured to generate, using digital preceding processing, a plurality of frequency-domain signals associated with a pilot and corresponding to a plurality of radio frequency chains, the plurality of frequency-domain signals being mapped to a second set of sub-carriers, a first number of the first set of sub-carriers exceeding a third number of the second set of sub-carriers;

a frequency-time domain transformer configured to generate a plurality of time-domain signals based on the plurality of frequency-domain signals by using frequency-time domain transformation, a second number of time-domain samples included in each of the time-domain signals being less than the first number of the first set of sub-carriers; and an analogue precoder configured to map, using analogue precoding processing, the plurality of time-domain signals to a plurality of antennas, wherein the plurality of antennas are configured to send the plurality of time-domain signals to a further communication device in the wireless communication system over a wireless channel.

16. The communication device according to claim 15, wherein the analogue precoder is configured to beamform the plurality of time-domain signals with a plurality of orthogonal beamforming vectors.

17. The communication device according to claim 16, further comprising:

a receiver configured to receive an indication of spatial correlation characteristics of the wireless channel from the further communication device; and wherein the analogue precoder is further configured to adjust weights of the beamforming vectors based on the spatial correlation characteristics.

18. The communication device according to claim 15, wherein the first number of the first set of sub-carriers is above two times as large as the third number of the second set of sub-carriers.

* * * * *